(12) United States Patent
Xu et al.

(10) Patent No.: US 12,550,120 B2
(45) Date of Patent: Feb. 10, 2026

(54) LOCATION OF TRACKING REFERENCE SIGNAL AVAILABILITY INFORMATION

(71) Applicant: QUALCOMM Incorporated, San Diego, CA (US)

(72) Inventors: Huilin Xu, Temecula, CA (US); Muhammad Nazmul Islam, Littleton, MA (US); Carsten Aagaard Pedersen, Bolton, MA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 18/045,983

(22) Filed: Oct. 12, 2022

(65) Prior Publication Data

US 2023/0217414 A1 Jul. 6, 2023

Related U.S. Application Data

(60) Provisional application No. 63/266,437, filed on Jan. 5, 2022.

(51) Int. Cl.
*H04W 68/02* (2009.01)
*H04L 5/00* (2006.01)

(52) U.S. Cl.
CPC ........... *H04W 68/02* (2013.01); *H04L 5/0051* (2013.01)

(58) Field of Classification Search
CPC . H04W 68/02; H04W 68/025; H04W 68/005; H04L 5/0051; H04L 5/0091; H04L 5/0048
See application file for complete search history.

(56) References Cited

U.S. PATENT DOCUMENTS

| | | | |
|---|---|---|---|
| 2022/0232514 A1* | 7/2022 | Tseng | H04W 60/00 |
| 2022/0271878 A1* | 8/2022 | Lin | H04W 68/02 |
| 2022/0321296 A1* | 10/2022 | Ye | H04L 5/0094 |
| 2023/0051117 A1* | 2/2023 | Tsai | H04L 5/0048 |
| 2024/0080152 A1* | 3/2024 | Shrivastava | H04W 52/0235 |
| 2024/0080801 A1* | 3/2024 | Andgart | H04W 68/02 |
| 2024/0098697 A1* | 3/2024 | Peng | H04W 72/232 |
| 2024/0187988 A1* | 6/2024 | Maleki | H04W 52/0216 |

(Continued)

FOREIGN PATENT DOCUMENTS

| | | |
|---|---|---|
| CN | 112673685 A | 4/2021 |
| CN | 113170282 A | 7/2021 |

OTHER PUBLICATIONS

International Search Report and Written Opinion—PCT/US2022/080242—ISA/EPO—Apr. 5, 2023.

(Continued)

*Primary Examiner* — Siu M Lee
(74) *Attorney, Agent, or Firm* — Harrity & Harrity, LLP

(57) ABSTRACT

Various aspects of the present disclosure generally relate to wireless communication. In some aspects, a user equipment (UE) may receive a paging early indication (PEI) physical downlink control channel communication with tracking reference signal (TRS) availability information at a location that is based at least in part on a length of a bitmap to be used for indicating a PEI. The UE may receive a TRS if the TRS availability information indicates that the TRS is to be transmitted. Numerous other aspects are described.

22 Claims, 12 Drawing Sheets

(56) References Cited

U.S. PATENT DOCUMENTS

2024/0365282 A1* 10/2024 Wu .................... H04W 68/005

OTHER PUBLICATIONS

Qualcomm Incorporated: "Paging Enhancements for Idle/Inactive UE Power Saving", 3GPP TSG-RAN WG1 #106-bis-e, R1-2110197, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, XP052059133, pp. 1-5, sections 2, 3.
Qualcomm Incorporated: "TRS/CSI-RS for Idle/Inactive UE Power Saving", 3GPP TSG-RAN WG1 #105-e, R1-2107357, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 6, 2021, XP052033556, pp. 1-4, sections 2-4.
3GPP: "3rd Generation Partnership Project, Technical Specification Group Radio Access Network, NR, Multiplexing and Channel Coding, (Release 17)", TS 38.212 V17.0.0, Dec. 2021, 184 Pages.
3GPP: 3rd Generation Partnership Project, Technical Specification Group Radio Access Network, NR, Physical layer procedures for control(Release 17), TS 38.213 V17.0.0, Dec. 2021, 226 Pages.
IN. Application No. 202214019597, filed on Mar. 31, 2022, 34 Pages.
IN. Application No. 202327076239, filed on Nov. 8, 2023, pp. 1-42.
IN. Application No. 202447051048, filed on Jul. 3, 2024, 35 Pages.

* cited by examiner

LOCATION OF TRACKING REFERENCE SIGNAL AVAILABILITY INFORMATION

CROSS-REFERENCE TO RELATED APPLICATION

This patent application claims priority to U.S. Provisional Patent Application No. 63/266,437, filed on Jan. 5, 2022, entitled "LOCATION OF TRACKING REFERENCE SIGNAL AVAILABILITY INFORMATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for locating tracking reference signal availability information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a paging early indication (PEI) physical downlink control channel (PDCCH) communication with tracking reference signal (TRS) availability information at a location that is based at least in part on a length of a bitmap to be used for indicating a PEI. The method may include receiving a TRS if the TRS availability information indicates that the TRS is to be transmitted.

Some aspects described herein relate to a method of wireless communication performed by a network entity. The method may include transmitting, to a UE, an indication of a length of a bitmap that the UE is to use for indicating a PEI in a PEI PDCCH communication. The method may include transmitting the PEI PDCCH communication with the bitmap and TRS availability information starting at a next bit after the bitmap. The method may include transmitting a TRS based at least in part on the TRS availability information.

Some aspects described herein relate to a method of wireless communication performed by a UE. The method may include receiving a PEI PDCCH communication that includes TRS availability information that starts at a specified starting bit location in the PEI PDCCH communication. The method may include receiving a TRS if the TRS availability information indicates that the TRS is to be transmitted.

Some aspects described herein relate to a method of wireless communication performed by a network entity. The method may include transmitting, to a UE, an indication of a specified starting bit location for TRS availability information in a PEI PDCCH communication. The method may include transmitting the PEI PDCCH communication with the TRS availability information that starts at the specified starting bit location in the PEI PDCCH communication.

Some aspects described herein relate to a UE for wireless communication. The UE may include a memory and one or more processors coupled to the memory. The one or more processors may be configured to receive a PEI PDCCH communication with TRS availability information at a location that is based at least in part on a length of a bitmap to be used for indicating a PEI. The one or more processors may be configured to receive a TRS if the TRS availability information indicates that the TRS is to be transmitted.

Some aspects described herein relate to a network entity for wireless communication. The network entity may include a memory and one or more processors coupled to the memory. The one or more processors may be configured to transmit, to a UE, an indication of a length of a bitmap that the UE is to use for indicating a PEI in a PEI PDCCH communication. The one or more processors may be configured to transmit the PEI PDCCH communication with the bitmap and TRS availability information starting at a next bit after the bitmap. The one or more processors may be configured to transmit a TRS based at least in part on the TRS availability information.

Some aspects described herein relate to a UE for wireless communication. The UE may include a memory and one or more processors coupled to the memory. The one or more processors may be configured to receive a PEI PDCCH communication that includes TRS availability information that starts at a specified starting bit location in the PEI PDCCH communication. The one or more processors may be configured to receive a TRS if the TRS availability information indicates that the TRS is to be transmitted.

Some aspects described herein relate to a network entity for wireless communication. The network entity may include a memory and one or more processors coupled to the memory. The one or more processors may be configured to transmit, to a UE, an indication of a specified starting bit location for TRS availability information in a PEI PDCCH communication. The one or more processors may be configured to transmit the PEI PDCCH communication with the TRS availability information that starts at the specified starting bit location in the PEI PDCCH communication.

Some aspects described herein relate to a non-transitory computer-readable medium that stores a set of instructions for wireless communication by a UE. The set of instructions, when executed by one or more processors of the UE, may cause the UE to receive a PEI PDCCH communication with TRS availability information at a location that is based at least in part on a length of a bitmap to be used for indicating a PEI. The set of instructions, when executed by one or more processors of the UE, may cause the UE to receive a TRS if the TRS availability information indicates that the TRS is to be transmitted.

Some aspects described herein relate to a non-transitory computer-readable medium that stores a set of instructions for wireless communication by a network entity. The set of instructions, when executed by one or more processors of the network entity, may cause the network entity to transmit, to a UE, an indication of a length of a bitmap that the UE is to use for indicating a PEI in a PEI PDCCH communication. The set of instructions, when executed by one or more processors of the network entity, may cause the network entity to transmit the PEI PDCCH communication with the bitmap and TRS availability information starting at a next bit after the bitmap. The set of instructions, when executed by one or more processors of the network entity, may cause the network entity to transmit a TRS based at least in part on the TRS availability information.

Some aspects described herein relate to a non-transitory computer-readable medium that stores a set of instructions for wireless communication by a UE. The set of instructions, when executed by one or more processors of the UE, may cause the UE to receive a PEI PDCCH communication that includes TRS availability information that starts at a specified starting bit location in the PEI PDCCH communication. The set of instructions, when executed by one or more processors of the UE, may cause the UE to receive a TRS if the TRS availability information indicates that the TRS is to be transmitted.

Some aspects described herein relate to a non-transitory computer-readable medium that stores a set of instructions for wireless communication by a network entity. The set of instructions, when executed by one or more processors of the network entity, may cause the network entity to transmit, to a UE, an indication of a specified starting bit location for TRS availability information in a PEI PDCCH communication. The set of instructions, when executed by one or more processors of the network entity, may cause the network entity to transmit the PEI PDCCH communication with the TRS availability information that starts at the specified starting bit location in the PEI PDCCH communication.

Some aspects described herein relate to an apparatus for wireless communication. The apparatus may include means for receiving a PEI PDCCH communication with TRS availability information at a location that is based at least in part on a length of a bitmap to be used for indicating a PEI. The apparatus may include means for receiving a TRS if the TRS availability information indicates that the TRS is to be transmitted.

Some aspects described herein relate to an apparatus for wireless communication. The apparatus may include means for transmitting, to a UE, an indication of a length of a bitmap that the UE is to use for indicating a PEI in a PEI PDCCH communication. The apparatus may include means for transmitting the PEI PDCCH communication with the bitmap and TRS availability information starting at a next bit after the bitmap. The apparatus may include means for transmitting a TRS based at least in part on the TRS availability information.

Some aspects described herein relate to an apparatus for wireless communication. The apparatus may include means for receiving a PEI PDCCH communication that includes TRS availability information that starts at a specified starting bit location in the PEI PDCCH communication. The apparatus may include means for receiving a TRS if the TRS availability information indicates that the TRS is to be transmitted.

Some aspects described herein relate to an apparatus for wireless communication. The apparatus may include means for transmitting, to a UE, an indication of a specified starting bit location for TRS availability information in a PEI PDCCH communication. The apparatus may include means for transmitting the PEI PDCCH communication with the TRS availability information that starts at the specified starting bit location in the PEI PDCCH communication.

Aspects generally include a method, apparatus, system, computer program product, non-transitory computer-readable medium, user equipment, base station, network node, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
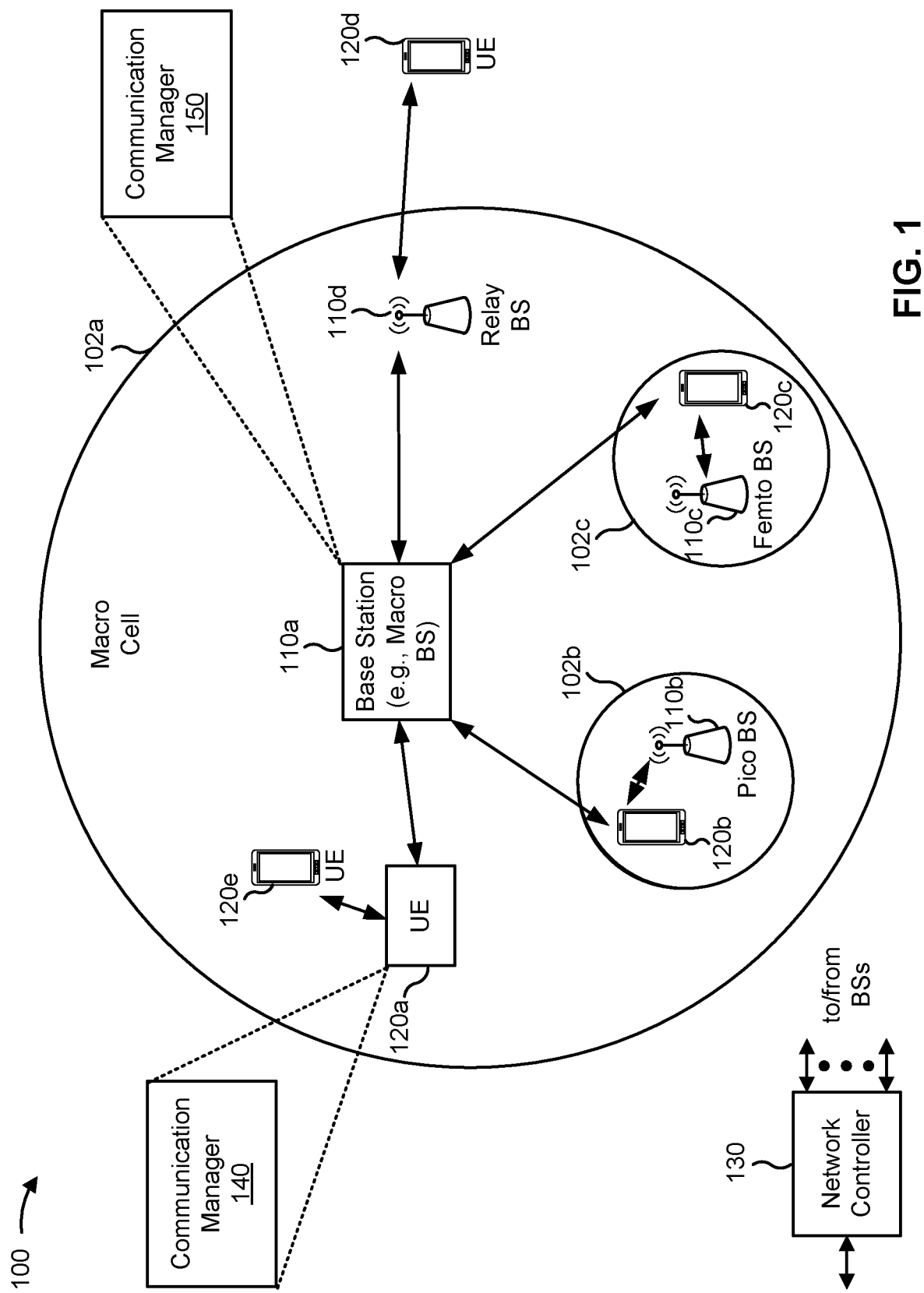
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the terms "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station" or "network entity" may refer to one device configured to perform one or more functions, such as those described herein in connection with the base station 110. In some aspects, the terms "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station" or "network entity" may refer to any one or more of those different devices. In some aspects, the terms "base station" or "network entity" may refer to one or more virtual base stations and/or one or more virtual base station functions. For example, in some aspects, two or more base station functions may be instantiated on a single device. In some aspects, the terms "base station" or "network entity" may refer to one of the base station functions and not another. In this way, a single device may include more than one base station.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a paging early indication (PEI) physical downlink control channel (PDCCH) communication with tracking reference signal (TRS) availability information at a location that is based at least in part on a length of a bitmap to be used for indicating a PEI. The communication manager 140 may receive a TRS if the TRS availability information indicates that the TRS is to be transmitted.

In some aspects, the communication manager 140 may receive a PEI PDCCH communication that includes TRS availability information that starts at a specified starting bit location in the PEI PDCCH communication. The communication manager 140 may receive a TRS if the TRS availability information indicates that the TRS is to be transmitted. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit, to a UE, an indication of a length of a bitmap that the UE is to use for indicating a PEI in a PEI PDCCH communication. The communication manager 150 may transmit the PEI PDCCH communication with the bitmap and TRS availability information starting at a next bit after the bitmap. The communication manager 150 may transmit a TRS based at least in part on the TRS availability information.

In some aspects, the communication manager 150 may transmit, to a UE, an indication of a specified starting bit location for TRS availability information in a PEI PDCCH communication. The communication manager 150 may transmit the PEI PDCCH communication with the TRS availability information that starts at the specified starting bit location in the PEI PDCCH communication. Additionally, or alternatively, the communication manager 150 may perform one or more other operations described herein.

As indicated above, FIG. 1 is provided as an example. Other examples may differ from what is described with regard to FIG. 1.

Figure 2:
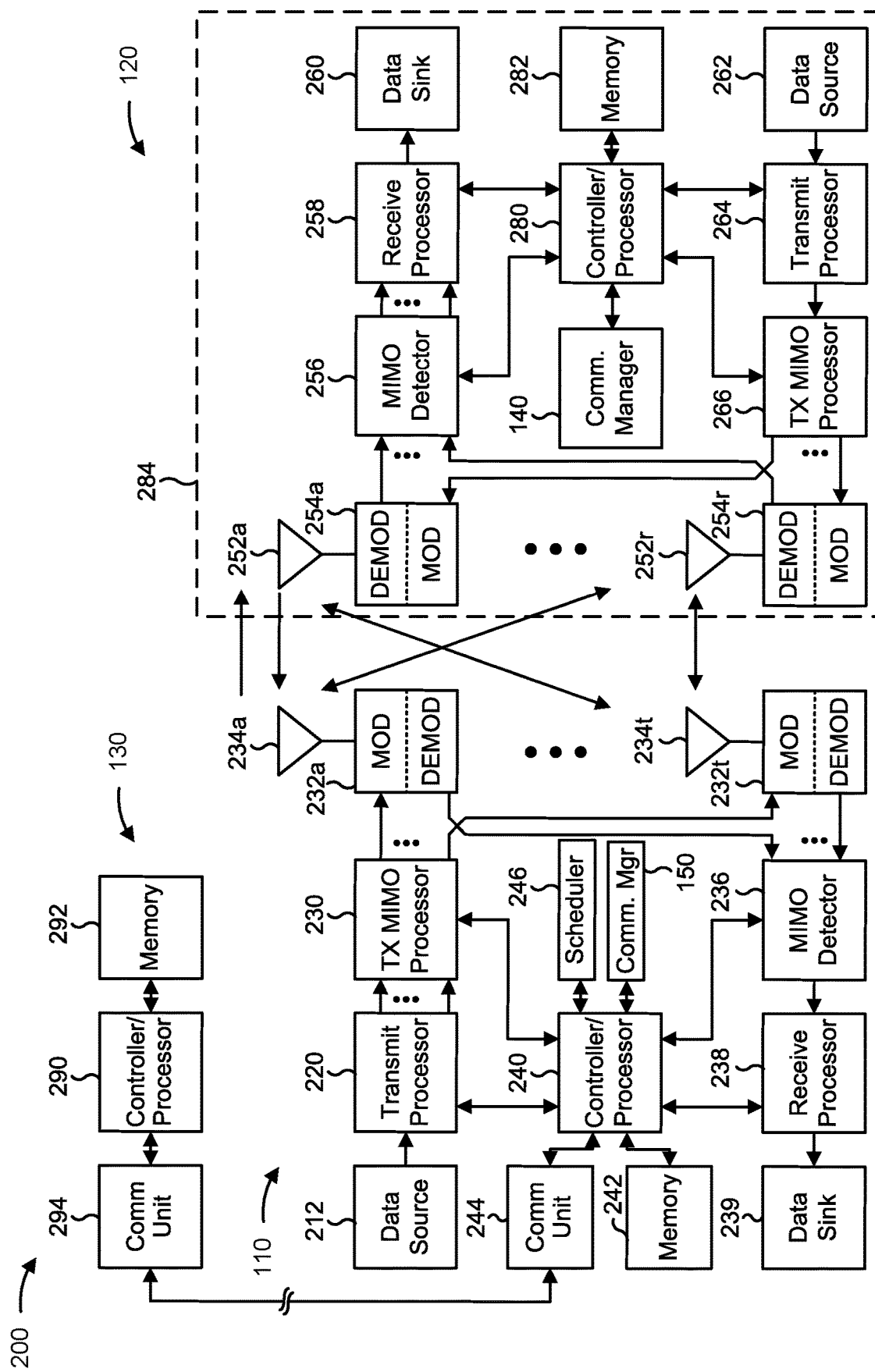
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234$a$ through 234$t$, such as T antennas (T≥1). The UE 120 may be equipped with a set of antennas 252$a$ through 252$r$, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232$a$ through 232$t$. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232$a$ through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-12).

The controller/processor of a network entity (e.g., the controller/processor 240 of the base station 110), the controller/processor 280 of the UE 120, and/or any other component(s) of FIG. 2 may perform one or more techniques associated with locating TRS availability information, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving a PEI PDCCH communication with TRS availability information at a location that is based at least in part on a length of a bitmap to be used for indicating a PEI; and/or means for receiving a TRS if the TRS availability information indicates that the TRS is to be transmitted. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for transmitting, to a UE, an indication of a length of a bitmap that the UE is to use for indicating a PEI PDCCH communication; means for transmitting the PEI PDCCH communication with the bitmap and TRS availability information starting at a next bit after the bitmap; and/or means for transmitting a TRS based at least in part on the TRS availability information. The means for the network entity to perform operations described herein may include, for example, one or more of communication manager 150, antenna 234, modem 232, MIMO detector 236, receive processor 238, transmit processor 220, TX MIMO processor 230, controller/processor 240, or memory 242.

In some aspects, the UE 120 includes means for receiving a PEI PDCCH communication that includes TRS availability information that starts at a specified starting bit location in the PEI PDCCH communication; and/or means for receiving a TRS if the TRS availability information indicates that the TRS is to be transmitted.

In some aspects, the network entity includes means for transmitting, to a UE, an indication of a specified starting bit location for TRS availability information in a PEI PDCCH communication; and/or means for transmitting the PEI PDCCH communication with the TRS availability information that starts at the specified starting bit location in the PEI PDCCH communication.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
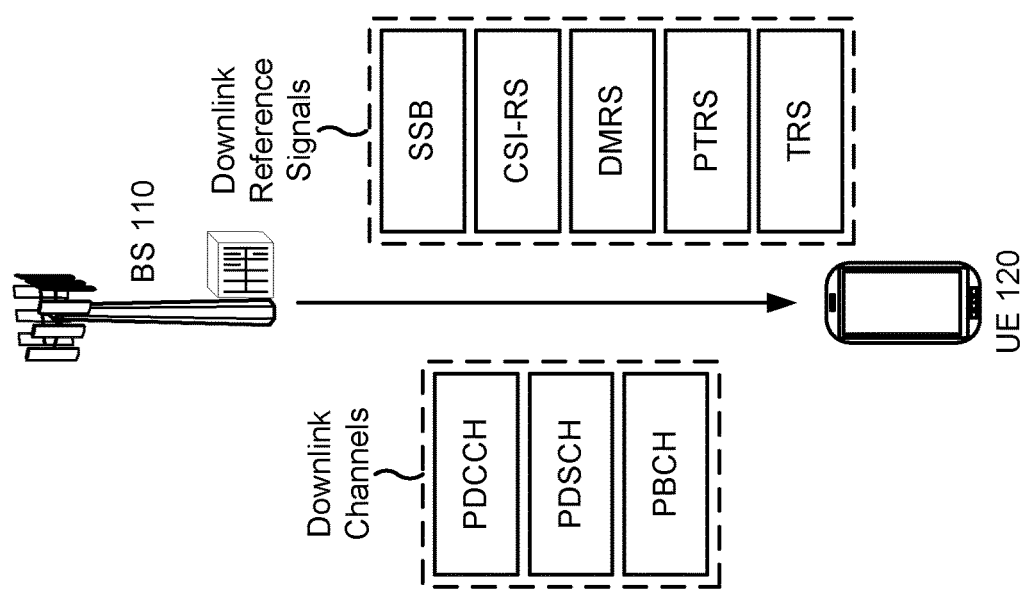
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a network entity (e.g., base station 110) to a UE 120.

As shown, a downlink channel may include a PDCCH that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. In some aspects, the UE 120 may transmit acknowledgement (ACK) or negative acknowledgement (NACK) feedback (e.g., ACK/NACK feedback or ACK/NACK information) in uplink control information (UCI) on a physical uplink control channel (PUCCH) and/or a physical uplink shared channel (PUSCH).

As further shown, a downlink reference signal may include a synchronization signal block (SSB), a channel state information (CSI) reference signal (CSI-RS), a DMRS, a positioning reference signal (PRS), a phase tracking reference signal (PTRS), or a TRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator, a layer indicator, a rank indicator, or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error.

Base stations in some cells may form a multicast broadcast single frequency network (MBSFN) area, and the MBSFN area may support broadcast, multicast, and unicast services. The TRS is a downlink signal that may be used to perform time synchronization or frequency synchronization with the MBSFN area, or to perform other tracking in order to receive communications in the MBSFN area. For example, a UE may use the TRS to update a tracking loop, which tracks changes to a frame timing of the network and an estimated time of arrival (TOA) of signals to be received by the UE. The UE may use the tracking loop updated by TRSs to perform operations quickly when transitioning from an idle or inactive state to a connected state.

The UE may be configured to operate in one of at least three radio resource control (RRC) states. For example, a UE may operate in an RRC_CONNECTED mode where the UE is connected to the wireless network (e.g., in both the control and user planes) through the base station. That is, a UE in an RRC_CONNECTED mode may have an access stratum (AS) context stored in the RAN, the UE may belong to a specific cell, the UE may communicate unicast data, and the RAN may control mobility of the UE. In an RRC_INACTIVE mode, the UE may have an RRC context established with the base station or a core network connection established, but no data transfer is possible from the UE. The UE may still be able to receive paging initiated by the RAN and receive a broadcast of system information. In an RRC_IDLE mode, where RRC context and base station or core network connections are not established, no data transfer is possible from the UE. The UE may still be able to receive a broadcast of system information. The base station may transmit the TRS to the UE when the UE is in an idle or inactive state. The TRS may provide the UE with additional reference signal opportunities for tracking loop updates when in the idle/inactive state.

The TRS may be periodic, semi-persistent, or aperiodic. Where the TRS is periodic, the TRS configuration information may identify the resources where the TRS will be periodically transmitted. Where the TRS is semi-persistent, the TRS may be activated and deactivated by a medium access control control element (MAC CE) and the TRS configuration information may identify the resources where the TRS will be transmitted when the TRS is activated or may identify a resource position relative to the resources carrying the MAC CE where the TRS will be transmitted. Where the TRS is aperiodic, the TRS may be triggered by the DCI for an uplink grant. The triggering uplink grant may indicate one of a set of slot offset values, and the TRS configuration information may identify a set of slot offset values, where the slot offset is the number of slots between the slot transmitting the TRS and the slot carrying the uplink DCI. The UE may receive the TRS and may compare the resources on which the TRS is received to the expected resources to perform time and frequency synchronization and tracking.

The TRS may include information that is associated with receiving the broadcast/multicast service that is based on an RRC state of the UE. For example, the information associated with the broadcast/multicast service may include a bandwidth part (BWP) on which the broadcast/multicast service is to be received by the UE when the UE is operating in an idle or inactive state. The information may include a BWP and/or a serving cell on which the broadcast/multicast service is to be received by the UE when the UE is operating in a connected state. The BWP and/or the serving cell may be configured to provide continuity of the broadcast/multicast service to be received by the UE when the UE is operating in the connected state. The base station may transmit the TRS in a multicast transmission to UEs that are in a connected state and moving, for BWP switching and/or cell switching or activation to maintain service continuity.

To utilize a TRS, the base station may transmit an RRC message or a system information block (SIB) with configuration information for the TRS (TRS configuration). The UE may store the TRS configuration. The TRS configuration may include a configuration for TRS resource sets and/or a configuration for TRS availability information. If TRS availability information indicates that a TRS is available, the UE may expect that the TRS is to be transmitted in a TRS occasion. A bit in a TRS availability indication field of Layer 1 signaling such as a PDCCH communication may indicate whether a group of TRS resource sets is to be transmitted. The TRS configuration may indicate the resources on which the base station may transmit the TRS and may indicate the TRS occasions. Layer 1 signaling may later provide the TRS availability information for a TRS occasion. The UE may then receive a TRS in the TRS occasion.

As indicated above, FIG. 3 is provided as an example. Other examples may differ from what is described with regard to FIG. 3.

Figure 4:
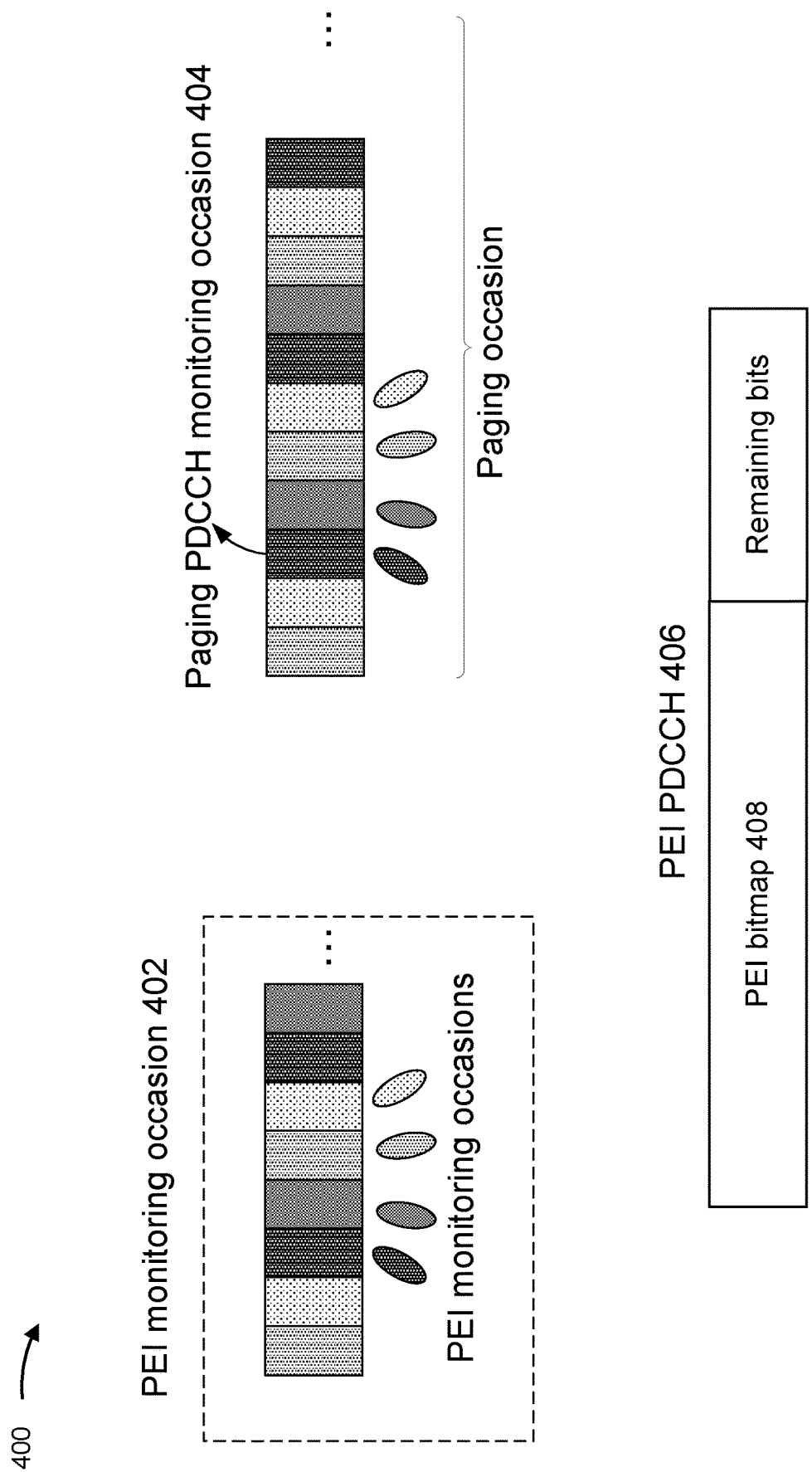
FIG. 4 is a diagram illustrating an example of paging early indications (PEIs) and paging occasions, in accordance with the present disclosure.

FIG. 4 is a diagram illustrating an example 400 of PEIs and POs, in accordance with the present disclosure.

A UE may enter an idle or inactive mode to save power. A network entity (e.g., base station) may transmit PDCCH communications (e.g., DCI, paging PDCCH) addressed to one or more UEs. The base station may transmit a PDCCH communication during a PO, which is a time occasion during which the UE may wake up and process the PDCCH communication. POs may be periodic or otherwise scheduled such that the UE does not need to be constantly awake to be paged. The UE may monitor for a PDCCH communication during a specific time (for a specific beam) during the PO. This specific time may be one of a set of monitoring occasions (MOs). The set of MOs may be included in the PO, and one or more POs may be included in a paging frame (PF). The UE is not expected to wake up and process a PDCCH communication for each PO, and thus a base station may transmit a PEI beforehand to indicate whether the UE is to process a PDCCH communication at an upcoming PO.

Example 400 shows PEI PDCCH monitoring occasions in a PEI occasion 402 and PDCCH MOs 404 of a PO in which a PDCCH communication may be received. The PDCCH communication may include a PEI that indicates whether the UE is to process the paging PDCCH of an upcoming PO. A PDCCH that includes a PEI may be referred to as a "PEI PDCCH" such as PEI PDCCH 406 shown in example 400. The PEI may include multiple bits, such as a PEI bitmap 408, in a PDCCH. Each bit may be associated with a subgroup of UEs. The PEI may be received in a PEI occasion. The PEI occasion may be a set of S consecutive PDCCH MOs when nrofPDCCH-MonitoringOccasion-PerSSB-InPO is not configured. S may be the quantity of actual transmitted SSBs determined according to ssb-PosilionsInBurst in a SIB 1. The time of a PEI occasion for a target PO may be based on, for example, the first PDCCH monitoring occasion of the PEI occasion, which may be provided with respect to an Lth SSB burst before the first PDCCH MO of the target PO. The PEI may be based on a UE subgrouping which splits UEs associated with a PO into multiple subgroups. The PEI may separately indicate whether UEs of a subgroup should process the paging PDCCH of the PO.

Paging PDCCH reception is a feature of the idle or inactive mode UE. The UE may determine a DCI format structure of the paging PDCCH and determine where a reserved bit field starts. Therefore, the base station may place TRS availability indication bits in the paging PDCCH immediately after the end of existing information fields and from the start of the reserved bit field.

The PEI PDCCH 406 may also provide a UE paging indication and availability information for TRSs for an idle or inactive UE. The base station may configure the DCI size of the PEI PDCCH 406 and the size for the PEI field (PEI bitmap 408) of the PEI PDCCH 406. The remaining unused bits can be used for a TRS availability indication. UEs that do not support a paging enhancement feature, such as UE subgrouping and wakeup based on the PEI, may not receive the RRC configuration of the PEI. Without the PEI configuration, the UE may not be able to determine how many bits of the PEI PDCCH 406 are used for the PEI. This can make a UE uncertain as to where to find a starting bit for the TRS availability indication in a PEI PDCCH 406. With such uncertainty, the UE may not obtain the TRS availability information and may not be prepared to receive a TRS in a TRS occasion. If the UE does not receive TRSs, the UE may not accurately update its tracking update loop. As a result, communications may degrade and the UE may waste processing resources and signaling resources.

As indicated above, FIG. 4 is provided as an example. Other examples may differ from what is described with regard to FIG. 4.

Figure 5:
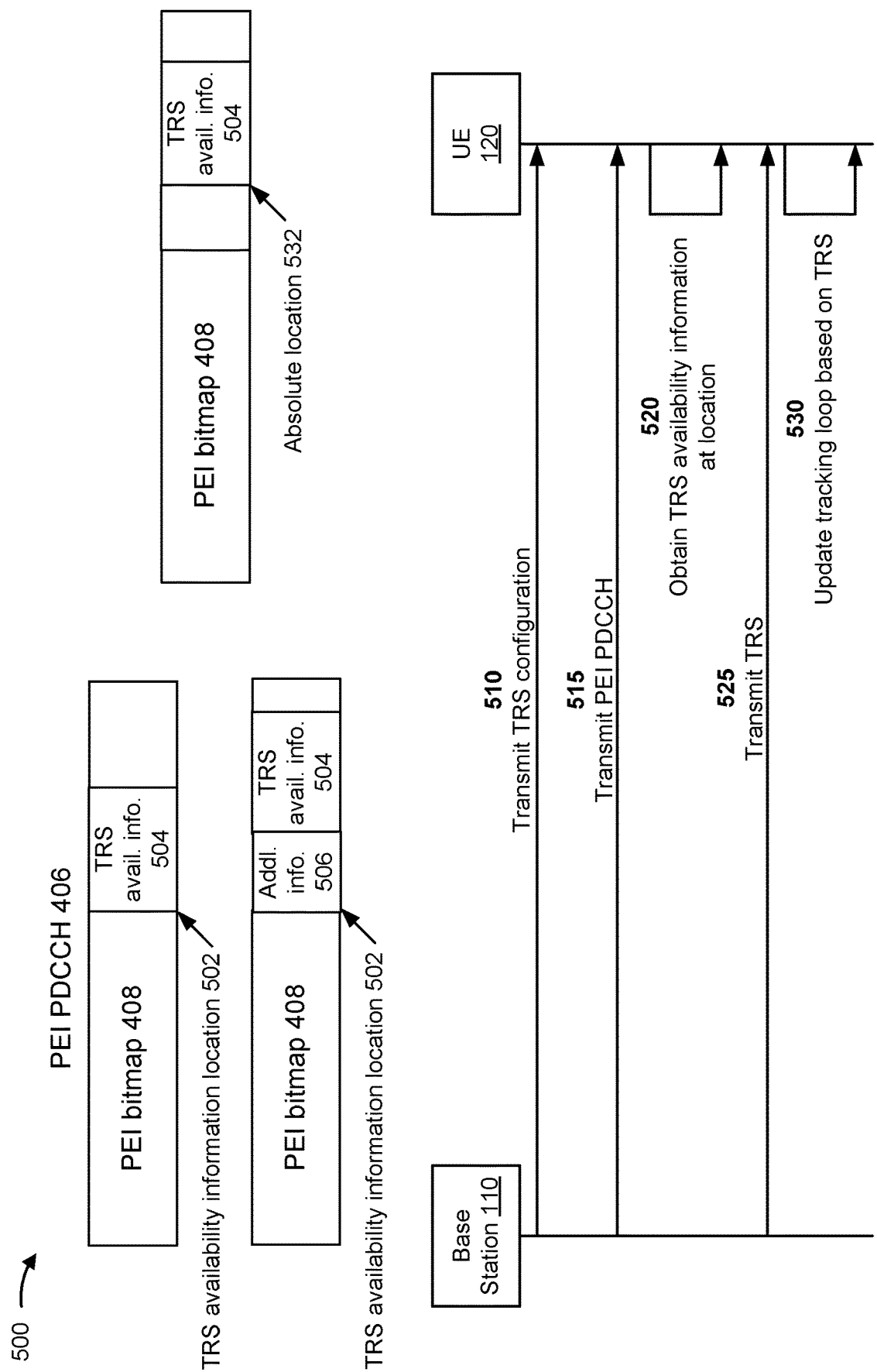
FIG. 5 is a diagram illustrating an example of locating tracking reference signal availability information in a PEI physical downlink control channel communication, in accordance with the present disclosure.

FIG. 5 is a diagram illustrating an example 500 of locating TRS availability information in a PEI PDCCH communication, in accordance with the present disclosure. As shown in FIG. 5, a network entity (e.g., base station 110) and a UE (e.g., a UE 120) may communicate with one another.

According to various aspects described herein, a UE may determine the starting bit location of the TRS availability indication in the PEI PDCCH 406 with more certainty. For example, as shown in example 500, the UE may determine the location 502 (e.g., starting bit) for TRS availability information 504 based on a length of the PEI bitmap 408 (e.g., quantity of bits) used for a PEI in the PEI PDCCH 406. In some aspects, the location 502 of the TRS availability information 504 may start from a next bit after the end of the PEI bitmap 408. The length of the PEI bitmap 408 may depend on the quantity of subgroups for each PO and the quantity of POs indicated by the PEI PDCCH.

Alternatively, in some aspects, the location 502 may start after additional information 506 in the PEI PDCCH 406, such as after the end of the PEI bitmap 408 plus a few bits used for the additional information 506. In some aspects, the base station 110 may configure the length of the PEI bitmap 408. The base station 110 may provide the length of the PEI bitmap 408 in the TRS availability indication configuration of the TRS configuration. While the base station 110 may have to reconfigure the TRS configuration whenever the base station 110 reconfigures the PEI bitmap 408 in the PEI configuration (has a different length), this may result in a more compact PEI PDCCH.

By specifying a location of the TRS availability information based on the length of the PEI bitmap 408, the UE may have more certainty of receiving the TRS when it is available. This aspect may serve UEs of different UE capabilities and configurations with respect to receiving the TRS. The UE may update its tracking loop and improve its communications as compared to when the UE had uncertainty about the TRS. As a result, the UE may conserve processing resources and signaling resources.

Example 500 shows use of a more certain location for the TRS availability information. As shown by reference number 510, the network entity (e.g., base station 110) may transmit a TRS configuration to the UE (e.g., UE 120). The TRS configuration may specify where to locate the TRS availability information 504, as shown by the location 502 in example 500. As shown by reference number 515, the base station 110 may transmit a PEI PDCCH 406. As shown by reference number 520, the UE 120 may obtain the TRS availability information 504, starting at the location 502 within the PEI PDCCH 406.

The TRS availability information 504 may indicate that a TRS is available and is to be transmitted. As shown by reference number 525, the base station 110 may transmit the TRS. As shown by reference number 530, the UE 120 may update its tracking loop based at least in part on the TRS.

A SIB may include a paging enhancement configuration that configures paging enhancements and that includes a UE subgrouping configuration and/or a PEI configuration. In some aspects, the UE may have a UE capability for receiving the paging enhancement configuration as an idle or inactive UE, even though the UE may not support the paging enhancements of UE subgrouping and wakeup based on PEI PDCCH. In this way, the UE may still locate the TRS availability information if other paging enhancements are not supported or used.

Alternatively, rather than associating the location 502 for the TRS availability information 504 with the length of the PEI bitmap 408, the TRS configuration may specify an absolute location 532 in the PEI PDCCH 406 for the TRS availability information 504. The absolute location 532 may not need to be updated whenever the base station 110 reconfigures the PEI. In some aspects, UE 120 may obtain the absolute location 532 within the PEI PDCCH 406 from stored configuration information (e.g., specified according to standard information). The absolute location 532 may be based at least in part on a maximum bitmap length for the PEI bitmap 408 that is to be configured by the network/base station 110. There may be one or more bits after the end of the PEI bitmap 408 that are not used by the TRS availability information 504. Accordingly, the network/base station 110 may not have to reconfigure for TRS availability information 504 each time the size of the PEI bitmap 408 is reconfigured. By indicating a specific location for the TRS availability information, more types of UEs may find the TRS availability information with more certainty and take advantage of TRSs.

As indicated above, FIG. 5 is provided as an example. Other examples may differ from what is described with respect to FIG. 5.

Figure 6:
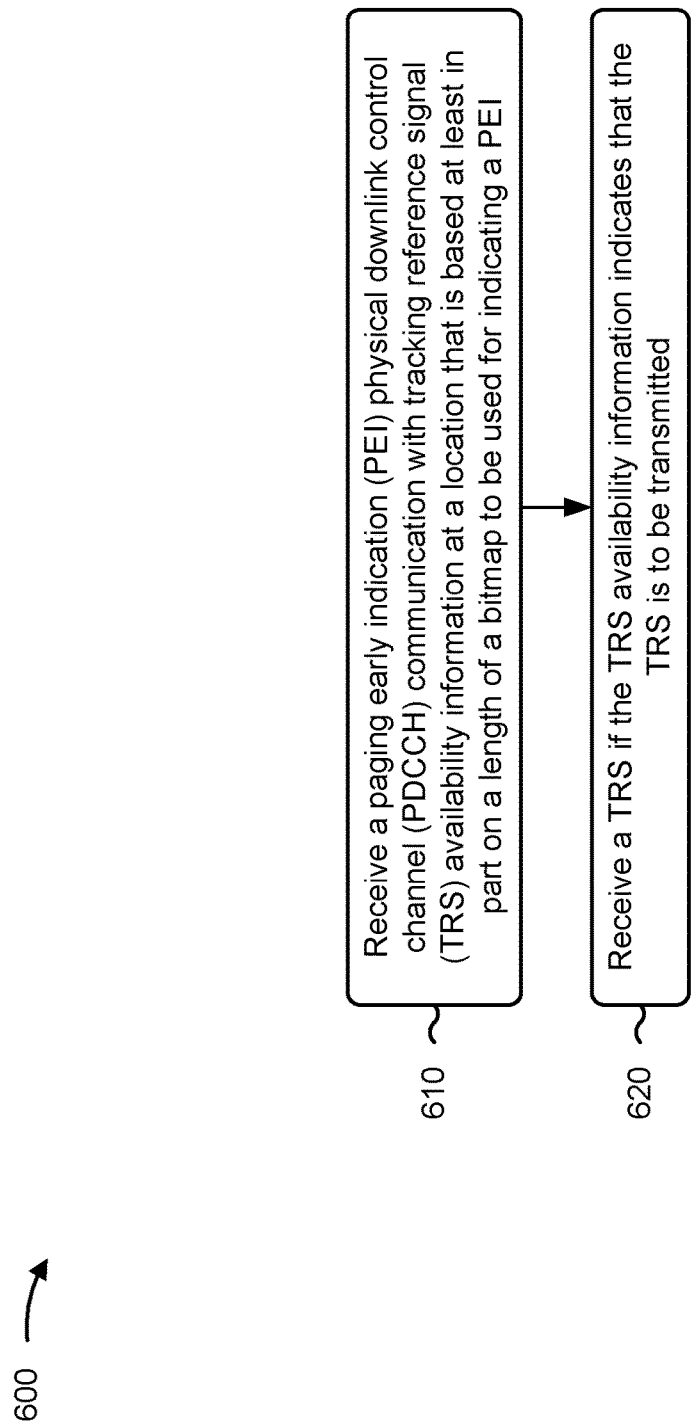
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with using a location of TRS availability information in a PEI PDCCH communication.

As shown in FIG. 6, in some aspects, process 600 may include receiving a PEI PDCCH communication with TRS availability information at a location that is based at least in part on a length of a bitmap to be used for indicating a PEI (block 610). For example, the UE (e.g., using communication manager 140 and/or reception component 1002 depicted in FIG. 10) may receive a PEI PDCCH communication with TRS availability information at a location that is based at least in part on a length of a bitmap to be used for indicating a PEI, as described above.

As further shown in FIG. 6, in some aspects, process 600 may include receiving a TRS if the TRS availability information indicates that the TRS is to be transmitted (block 620). For example, the UE (e.g., using communication manager 140 and/or reception component 1002 depicted in FIG. 10) may receive a TRS if the TRS availability information indicates that the TRS is to be transmitted, as described above. In some aspects, the UE may receive a TRS based at least in part on the TRS availability information indicating that the TRS is to be transmitted, as described above.

Process 600 may include additional aspects, such as any single aspect or any combination of aspects described below and/or in connection with one or more other processes described elsewhere herein.

In a first aspect, the location in the PEI PDCCH communication starts from a next bit after an end of the bitmap.

In a second aspect, alone or in combination with the first aspect, the location in the PEI PDCCH communication starts from a next bit after additional information that is included in the PEI PDCCH communication after the bitmap.

In a third aspect, alone or in combination with one or more of the first and second aspects, process 600 includes receiving a configuration for paging enhancements in a system information block based at least in part on a UE capability of the UE for receiving configurations for paging enhancements.

In a fourth aspect, alone or in combination with one or more of the first through third aspects, the UE capability is for an idle or inactive state of the UE.

In a fifth aspect, alone or in combination with one or more of the first through fourth aspects, the UE capability does not support paging enhancements for UE subgrouping or wakeup based at least in part on the PEI.

In a sixth aspect, alone or in combination with one or more of the first through fifth aspects, process 600 includes receiving an indication of the length of the bitmap.

In a seventh aspect, alone or in combination with one or more of the first through sixth aspects, process 600 includes receiving a TRS configuration in association with or associated with the indication.

In an eighth aspect, alone or in combination with one or more of the first through seventh aspects, a length of the PEI is based at least in part on a quantity of paging occasions indicated by the PEI PDCCH communication and a quantity of subgroups of each paging occasion.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
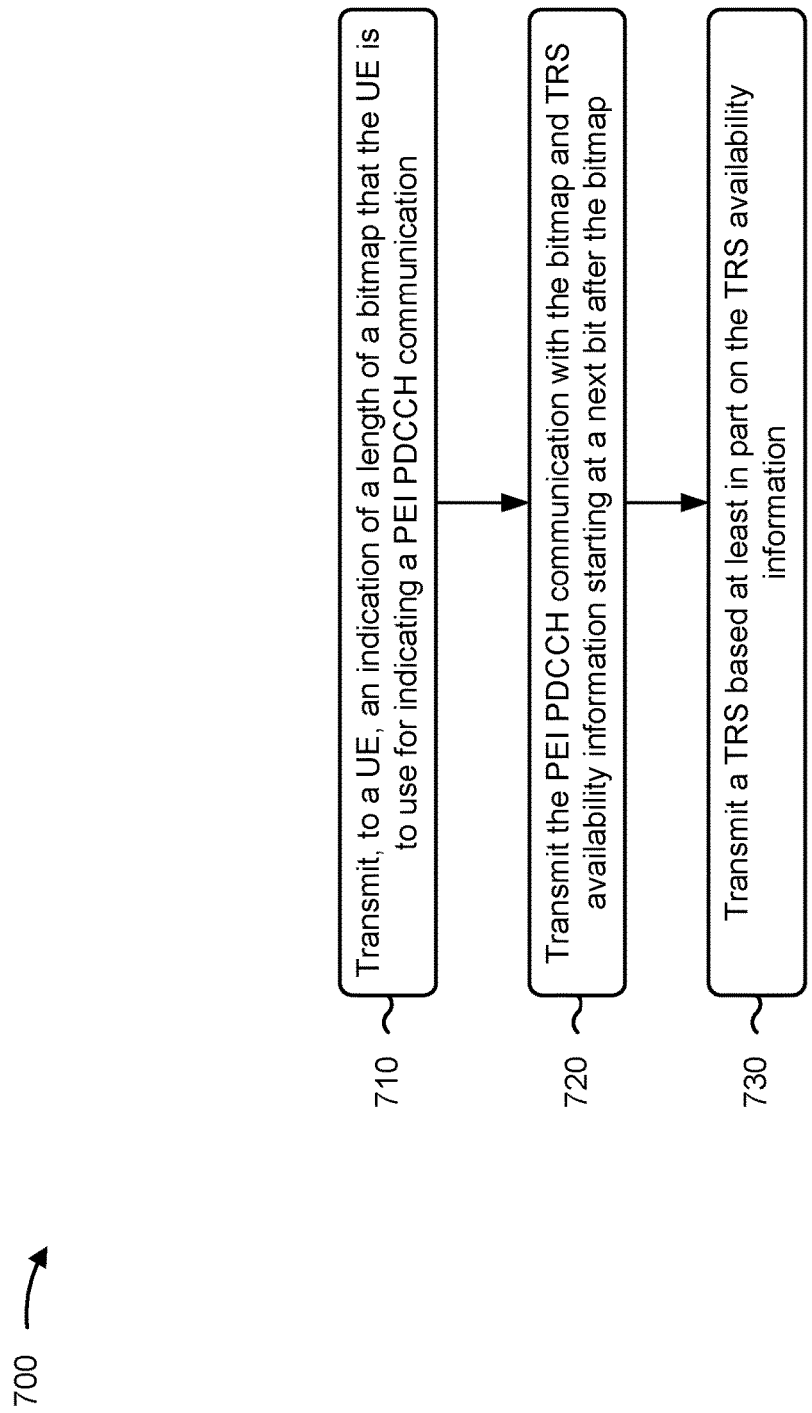
FIG. 7 is a diagram illustrating an example process performed, for example, by a network entity, in accordance with the present disclosure.

FIG. 7 is a diagram illustrating an example process 700 performed, for example, by a network entity, in accordance with the present disclosure. Example process 700 is an example where the network entity (e.g., base station 110) performs operations associated with using a location of TRS availability information in a PEI PDCCH communication.

As shown in FIG. 7, in some aspects, process 700 may include transmitting, to a UE, an indication of a length of a bitmap that the UE is to use for indicating a PEI in a PEI PDCCH communication (block 710). For example, the network entity (e.g., using communication manager 150 and/or transmission component 1104 depicted in FIG. 11) may transmit, to a UE, an indication of a length of a bitmap that the UE is to use for indicating a PEI in a PEI PDCCH communication, as described above.

As further shown in FIG. 7, in some aspects, process 700 may include transmitting the PEI PDCCH communication with the bitmap and TRS availability information starting at a next bit after the bitmap (block 720). For example, the network entity (e.g., using communication manager 150 and/or transmission component 1104 depicted in FIG. 11) may transmit the PEI PDCCH communication with the bitmap and TRS availability information starting at a next bit after the bitmap, as described above.

As further shown in FIG. 7, in some aspects, process 700 may include transmitting a TRS based at least in part on the TRS availability information (block 730). For example, the network entity (e.g., using communication manager 150 and/or transmission component 1104 depicted in FIG. 11) may transmit a TRS based at least in part on the TRS availability information, as described above.

Process 700 may include additional aspects, such as any single aspect or any combination of aspects described below and/or in connection with one or more other processes described elsewhere herein.

In a first aspect, process 700 includes transmitting a configuration for paging enhancements in a system information block based at least in part on a UE capability of the UE for receiving configurations for paging enhancements.

In a second aspect, alone or in combination with the first aspect, process 700 includes transmitting a TRS configuration associated with the indication.

In a third aspect, alone or in combination with one or more of the first and second aspects, process 700 includes reconfiguring the TRS configuration based at least in part on a reconfiguration of the length of the bitmap.

In a fourth aspect, alone or in combination with one or more of the first through third aspects, process 700 includes transmitting the reconfigured TRS configuration and the reconfigured length of the bitmap.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with using a location of TRS availability information in a PEI PDCCH communication.

As shown in FIG. 8, in some aspects, process 800 may include receiving a PEI PDCCH communication that includes TRS availability information that starts at a specified starting bit location in the PEI PDCCH communication (block 810). For example, the UE (e.g., using communication manager 140 and/or reception component 1002 depicted in FIG. 10) may receive a PEI PDCCH communication that includes TRS availability information that starts at a specified starting bit location in the PEI PDCCH communication, as described above.

As further shown in FIG. 8, in some aspects, process 800 may include receiving a TRS if the TRS availability information indicates that the TRS is to be transmitted (block 820). For example, the UE (e.g., using communication manager 140 and/or reception component 1002 depicted in FIG. 10) may receive a TRS if the TRS availability information indicates that the TRS is to be transmitted, as described above.

Process 800 may include additional aspects, such as any single aspect or any combination of aspects described below and/or in connection with one or more other processes described elsewhere herein.

In a first aspect, process 800 includes receiving an indication of the specified starting bit location from a network entity.

In a second aspect, alone or in combination with the first aspect, process 800 includes obtaining an indication of the specified starting bit location from stored configuration information.

In a third aspect, alone or in combination with the second aspect, process 800 includes receiving a configuration for paging enhancements in a system information block based at least in part on a UE capability of the UE for receiving configurations for paging enhancements.

In a fourth aspect, alone or in combination with the third aspect, process 800 includes receiving an indication of a length of a bitmap associated with indicating the PEI in the PEI PDCCH communication.

In a fifth aspect, alone or in combination with the fourth aspect, process 800 includes receiving a TRS configuration associated with the indication.

In a sixth aspect, alone or in combination with the fifth aspect, one or more bits after an end of the bitmap are not used by the TRS availability information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
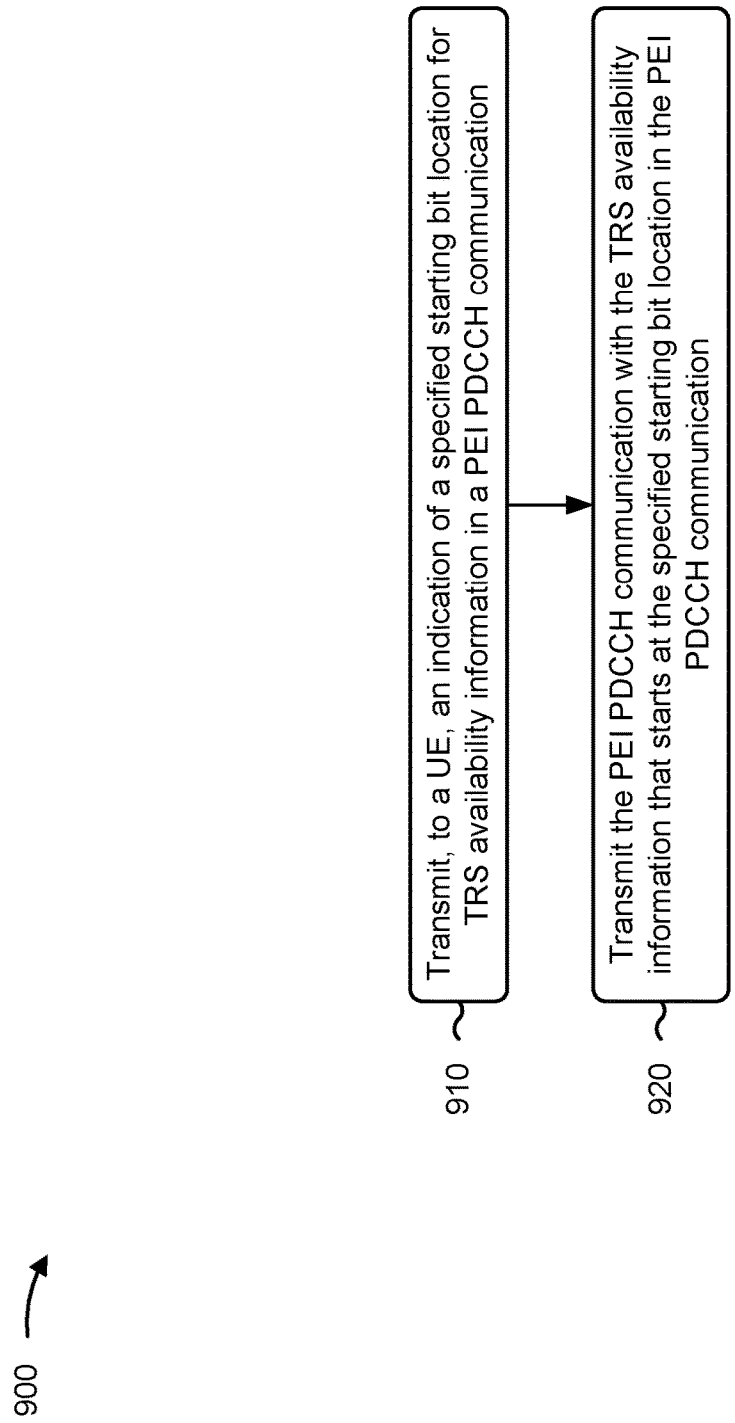
FIG. 9 is a diagram illustrating an example process performed, for example, by a network entity, in accordance with the present disclosure.

FIG. 9 is a diagram illustrating an example process 900 performed, for example, by a network entity, in accordance with the present disclosure. Example process 900 is an example where the network entity (e.g., base station 110) performs operations associated with using a location of TRS availability information in a PEI PDCCH communication.

As shown in FIG. 9, in some aspects, process 900 may include transmitting, to a UE, an indication of a specified starting bit location for TRS availability information in a PEI PDCCH communication (block 910). For example, the network entity (e.g., using communication manager 150 and/or transmission component 1104 depicted in FIG. 11) may transmit, to a UE, an indication of a specified starting bit location for TRS availability information in a PEI PDCCH communication, as described above.

As further shown in FIG. 9, in some aspects, process 900 may include transmitting the PEI PDCCH communication with the TRS availability information that starts at the specified starting bit location in the PEI PDCCH communication (block 920). For example, the network entity (e.g., using communication manager 150 and/or transmission component 1104 depicted in FIG. 11) may transmit the PEI PDCCH communication with the TRS availability information that starts at the specified starting bit location in the PEI PDCCH communication, as described above.

Process 900 may include additional aspects, such as any single aspect or any combination of aspects described below and/or in connection with one or more other processes described elsewhere herein.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
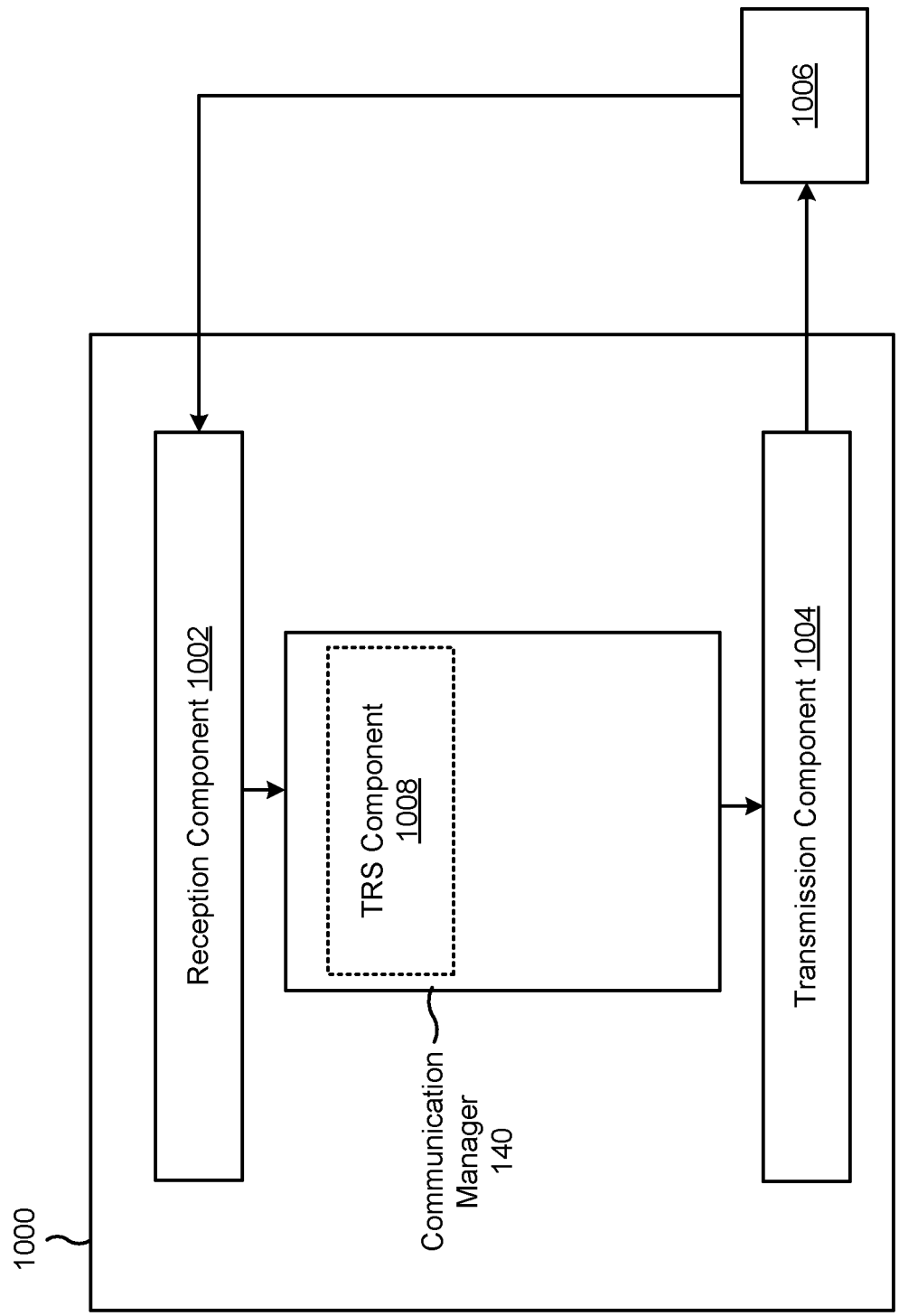
FIGS. 10-11 are diagrams of example apparatuses for wireless communication, in accordance with the present disclosure.

FIG. 10 is a diagram of an example apparatus 1000 for wireless communication. The apparatus 1000 may be a UE (e.g., a UE 120), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, a network entity, or another wireless communication device) using the reception component 1002 and the transmission component 1004. As further shown, the apparatus 1000 may include the communication manager 140. The communication manager 140 may include a TRS component 1008, among other examples.

In some aspects, the apparatus 1000 may be configured to perform one or more operations described herein in connection with FIGS. 1-5. Additionally, or alternatively, the apparatus 1000 may be configured to perform one or more processes described herein, such as process 600 of FIG. 6, process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive a PEI PDCCH communication with TRS availability information at a location that is based at least in part on a length of a bitmap to be used for indicating a PEI. The reception component 1002 may receive a TRS if the TRS availability information indicates that the TRS is to be transmitted.

The reception component 1002 may receive a configuration for paging enhancements in a system information block based at least in part on a UE capability of the UE for receiving configurations for paging enhancements. The reception component 1002 may receive an indication of the length of the bitmap. The reception component 1002 may receive a TRS configuration in association with the indication.

Alternatively, in some aspects, the reception component 1002 may receive a PEI PDCCH communication that includes TRS availability information that starts at a specified starting bit location in the PEI PDCCH communication. The reception component 1002 may receive a TRS if the TRS availability information indicates that the TRS is to be transmitted. The reception component 1002 may receive an indication of the specified starting bit location from a network entity. The TRS component 1008 may obtain an indication of the specified starting bit location from stored configuration information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
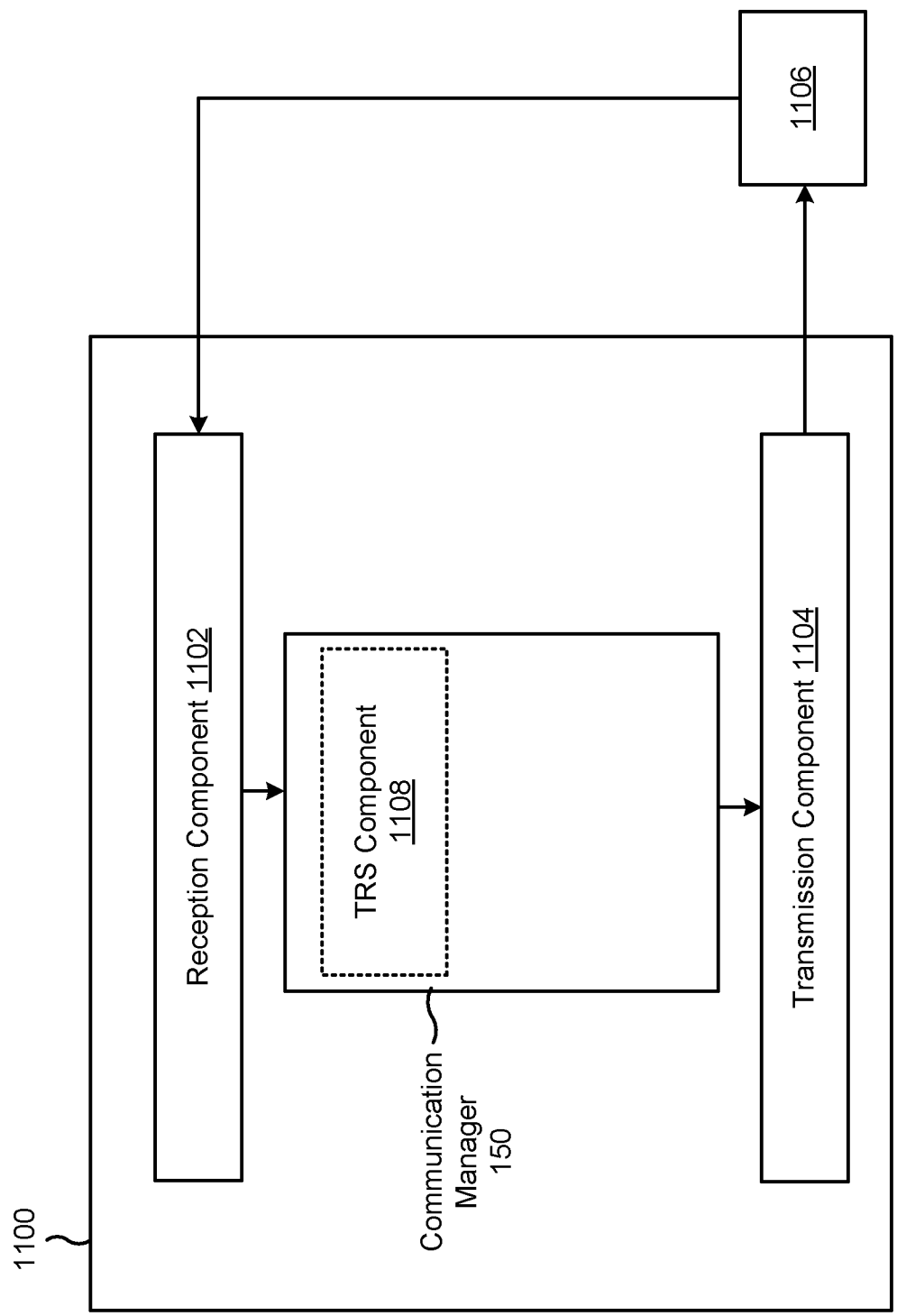

FIG. 11 is a diagram of an example apparatus 1100 for wireless communication. The apparatus 1100 may be a network entity (e.g., base station 110), or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, a network entity, or another wireless communication device) using the reception component 1102 and the transmission component 1104. As further shown, the apparatus 1100 may include the communication manager 150. The communication manager 150 may include a TRS component 1108, among other examples.

In some aspects, the apparatus 1100 may be configured to perform one or more operations described herein in connection with FIGS. 1-5. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to a UE, an indication of a length of a bitmap that the UE is to use for indicating a PEI in a PEI PDCCH communication. The transmission component 1104 may transmit the PEI PDCCH communication with the bitmap and TRS availability information starting at a next bit after the bitmap. The transmission component 1104 may transmit a TRS based at least in part on the TRS availability information. The TRS component 1108 may configure the location of the TRS availability information.

The transmission component 1104 may transmit, to a UE, an indication of a specified starting bit location for TRS availability information in a PEI PDCCH communication. The transmission component 1104 may transmit the PEI PDCCH communication with the TRS availability information that starts at the specified starting bit location in the PEI PDCCH communication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
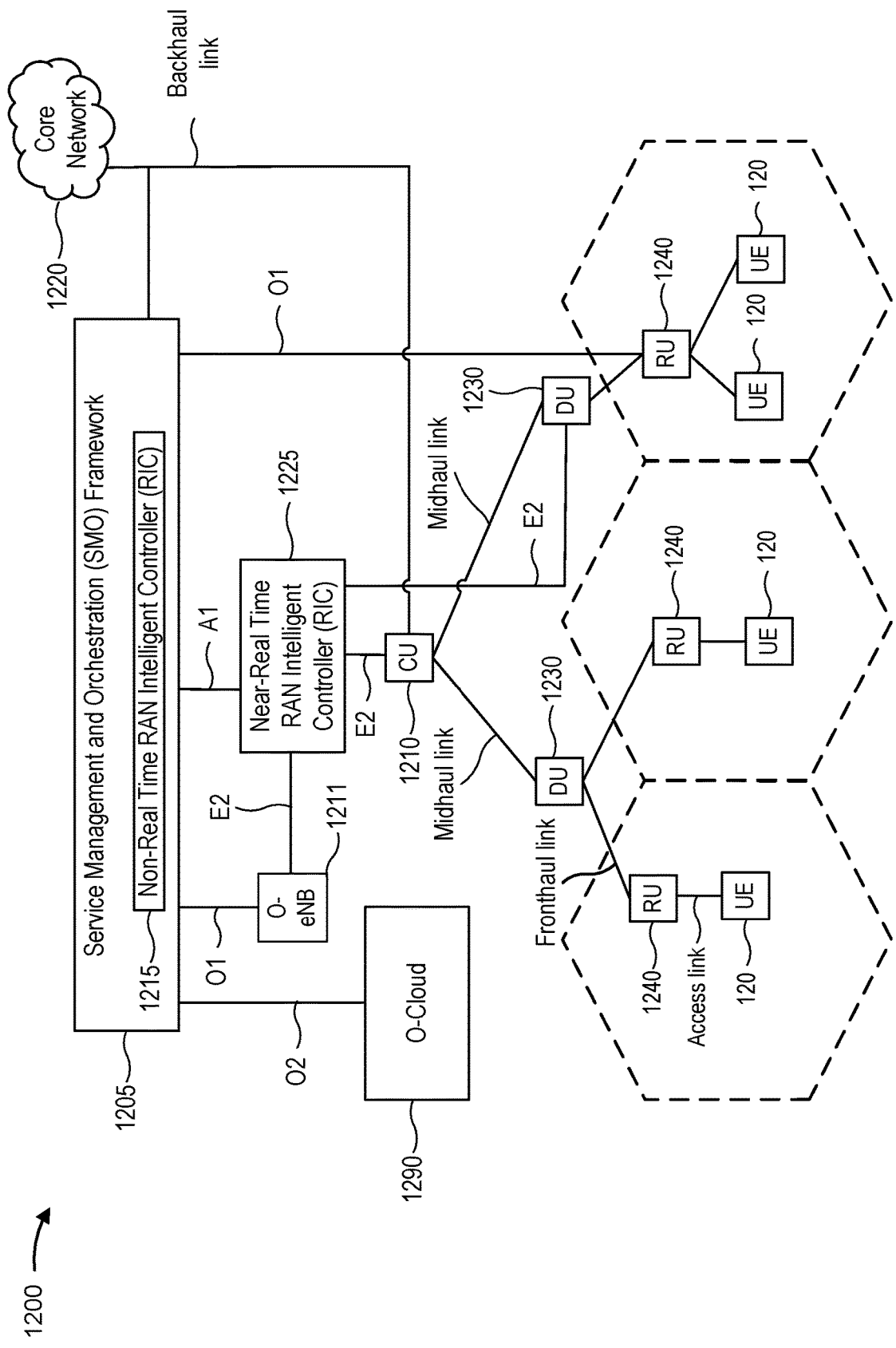
FIG. 12 is a diagram illustrating an example of a disaggregated base station, in accordance with the present disclosure.

FIG. 12 is a diagram illustrating an example of a disaggregated base station 1200, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 1200 architecture may include one or more CUs 1210 that can communicate directly with a core network 1220 via a backhaul link, or indirectly with the core network 1220 through one or more disaggregated base station units (such as a Near-RT RIC 1225 via an E2 link, or a Non-RT RIC 1215 associated with a Service Management and Orchestration (SMO) Framework 1205, or both). A CU 1210 may communicate with one or more DUs 1230 via respective midhaul links, such as an F1 interface. The DUs 1230 may communicate with one or more RUs 1240 via respective fronthaul links. The fronthaul link, the midhaul link, and the backhaul link may be generally referred to as "communication links." The RUs 1240 may communicate with respective UEs 120 via one or more RF access links. In some aspects, the UE 120 may be simultaneously served by multiple RUs 1240. The DUs 1230 and the RUs 1240 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 1210, the DUs 1230, the RUs 1240, as well as the Near-RT RICs 1225, the Non-RT RICs 1215 and the SMO Framework 1205) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1210 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 1210. The CU 1210 may be configured to handle user plane functionality (i.e., Central Unit—User Plane (CU-UP)), control plane functionality (i.e., Central Unit—Control Plane (CU-CP)), or a combination thereof. In some implementations, the CU 1210 can be logically split into one or more CU-UP units and one or more CU-CP units. The CU-UP unit can communicate bidirectionally with the CU-CP unit via an interface, such as the E1 interface when implemented in an O-RAN configuration. The CU 1210 can be implemented to communicate with the DU 1230, as necessary, for network control and signaling.

The DU 1230 may correspond to a logical unit that includes one or more base station functions to control the operation of one or more RUs 1240. In some aspects, the DU 1230 may host one or more of a radio link control (RLC) layer, a MAC layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1230 may further host one or more low PHY layers. Each layer (or module) can be implemented with an interface configured to communicate signals with other layers (and modules) hosted by the DU 1230, or with the control functions hosted by the CU 1210.

Lower-layer functionality can be implemented by one or more RUs 1240. In some deployments, an RU 1240, controlled by a DU 1230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1240 can be implemented to handle over the air (OTA) communication with one or more UEs 120. In some implementations, real-time and non-real-time aspects of control and user plane communication with the RU(s) 1240 can be controlled by the corresponding DU 1230. In some scenarios, this configuration can enable the DU(s) 1230 and the CU 1210 to be implemented in a cloud-based RAN architecture, such as a vRAN architecture.

The SMO Framework 1205 may be configured to support RAN deployment and provisioning of non-virtualized and virtualized network elements. For non-virtualized network elements, the SMO Framework 1205 may be configured to support the deployment of dedicated physical resources for RAN coverage requirements which may be managed via an operations and maintenance interface (such as an O1 interface). For virtualized network elements, the SMO Framework 1205 may be configured to interact with a cloud computing platform (such as an open cloud (O-Cloud) 1290) to perform network element life cycle management (such as to instantiate virtualized network elements) via a cloud computing platform interface (such as an O2 interface). Such virtualized network elements can include, but are not limited to, CUs 1210, DUs 1230, RUs 1240 and Near-RT RICs 1225. In some implementations, the SMO Framework 1205 can communicate with a hardware aspect of a 4G RAN, such as an open eNB (O-eNB) 1211, via an O1 interface. Additionally, in some implementations, the SMO Framework 1205 can communicate directly with one or more RUs 1240 via an O1 interface. The SMO Framework 1205 also may include a Non-RT RIC 1215 configured to support functionality of the SMO Framework 1205.

The Non-RT RIC 1215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1225. The Non-RT RIC 1215 may be coupled to or communicate with (such as via an A1 interface) the Near-RT RIC 1225. The Near-RT RIC 1225 may be configured to include a logical function that enables near-real-time control and optimization of RAN elements and resources via data collection and actions over an interface (such as via an E2 interface) connecting one or more CUs 1210, one or more DUs 1230, or both, as well as an O-eNB, with the Near-RT RIC 1225.

In some implementations, to generate AI/ML models to be deployed in the Near-RT RIC 1225, the Non-RT RIC 1215 may receive parameters or external enrichment information from external servers. Such information may be utilized by the Near-RT RIC 1225 and may be received at the SMO Framework 1205 or the Non-RT RIC 1215 from non-network data sources or from network functions. In some examples, the Non-RT RIC 1215 or the Near-RT RIC 1225 may be configured to tune RAN behavior or performance. For example, the Non-RT RIC 1215 may monitor long-term trends and patterns for performance and employ AI/ML models to perform corrective actions through the SMO Framework 1205 (such as reconfiguration via O1) or via creation of RAN management policies (such as A1 policies).

As indicated above, FIG. 12 is provided as an example. Other examples may differ from what is described with regard to FIG. 12.

The following provides an overview of some Aspects of the present disclosure:

Aspect 1: A method of wireless communication performed by a user equipment (UE), comprising: receiving a paging early indication (PEI) physical downlink control channel (PDCCH) communication with tracking reference signal (TRS) availability information at a location that is based at least in part on a length of a bitmap to be used for indicating a PEI; and receiving a TRS if the TRS availability information indicates that the TRS is to be transmitted.

Aspect 2: The method of Aspect 1, wherein the location in the PEI PDCCH communication starts from a next bit after an end of the bitmap.

Aspect 3: The method of Aspect 1, wherein the location in the PEI PDCCH communication starts from a next bit after additional information that is included in the PEI PDCCH communication after the bitmap.

Aspect 4: The method of any of Aspects 1-3, further comprising receiving a configuration for paging enhancements in a system information block based at least in part on a UE capability of the UE for receiving configurations for paging enhancements.

Aspect 5: The method of Aspect 4, wherein the UE capability is for an idle or inactive state of the UE.

Aspect 6: The method of Aspect 4, wherein the UE capability does not support paging enhancements for UE subgrouping or wakeup based at least in part on the PEI.

Aspect 7: The method of any of Aspects 1-6, further comprising receiving an indication of the length of the bitmap.

Aspect 8: The method of Aspect 7, further comprising receiving a TRS configuration associated with the indication.

Aspect 9: The method of any of Aspects 1-8, a length of the PEI is based at least in part on a quantity of paging occasions indicated by the PEI PDCCH communication and a quantity of subgroups of each paging occasion.

Aspect 10: A method of wireless communication performed by a network entity, comprising: transmitting, to a user equipment (UE), an indication of a length of a bitmap that the UE is to use for indicating a paging early indication (PEI) in a PEI physical downlink control channel (PDCCH) communication; transmitting the PEI PDCCH communication with the bitmap and tracking reference signal (TRS) availability information starting at a next bit after the bitmap; and transmitting a TRS based at least in part on the TRS availability information.

Aspect 11: The method of Aspect 10, wherein the one or more processors are configured to transmit a configuration for paging enhancements in a system information block based at least in part on a UE capability of the UE for receiving configurations for paging enhancements.

Aspect 12: The method of Aspect 10, wherein the one or more processors are configured to transmit a TRS configuration associated with the indication.

Aspect 13: The method of Aspect 12, wherein the one or more processors are configured to reconfigure the TRS configuration based at least in part on a reconfiguration of the length of the bitmap.

Aspect 14: The method of Aspect 13, wherein the one or more processors are configured to transmit the reconfigured TRS configuration and the reconfigured length of the bitmap.

Aspect 15: A method of wireless communication performed by a user equipment (UE), comprising: receiving a paging early indication (PEI) physical downlink control channel (PDCCH) communication that includes tracking reference signal (TRS) availability information that starts at a specified starting bit location in the PEI PDCCH communication; and receiving a TRS if the TRS availability information indicates that the TRS is to be transmitted.

Aspect 16: The method of Aspect 15, further comprising receiving an indication of the specified starting bit location from a network entity.

Aspect 17: The method of Aspect 15, further comprising obtaining an indication of the specified starting bit location from stored configuration information.

Aspect 18: The method of any of Aspects 15-17, wherein the one or more processors are configured to receive a configuration for paging enhancements in a system information block based at least in part on a UE capability of the UE for receiving configurations for paging enhancements.

Aspect 19: The method of any of Aspects 15-18, wherein the one or more processors are configured to receive an indication of a length of a bitmap associated with indicating the PEI in the PEI PDCCH communication.

Aspect 20: The method of Aspect 19, wherein the one or more processors are configured to receive a TRS configuration associated with the indication.

Aspect 21: The method of Aspect 19 or 20, wherein one or more bits after an end of the bitmap are not used by the TRS availability information.

Aspect 22: A method of wireless communication performed by a network entity, comprising: transmitting, to a user equipment (UE), an indication of a specified starting bit location for tracking reference signal (TRS)

availability information in a paging early indication (PEI) physical downlink control channel (PDCCH) communication; and transmitting the PEI PDCCH communication with the TRS availability information that starts at the specified starting bit location in the PEI PDCCH communication.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   receive a configuration for paging enhancements in a system information block based at least in part on a UE capability of the UE for receiving configurations for paging enhancements, wherein the UE capability is for an idle or inactive state of the UE, and wherein the UE capability does not support paging enhancements for UE subgrouping or wakeup based at least in part on a paging early indication (PEI);
   receive a PEI physical downlink control channel (PDCCH) communication with tracking reference signal (TRS) availability information at a location that is based at least in part on a length of a bitmap to be used for indicating a PEI; and
   receive a TRS if the TRS availability information indicates that the TRS is to be transmitted.

2. The UE of claim 1, wherein the location in the PEI PDCCH communication starts from a next bit after an end of the bitmap.

3. The UE of claim 1, wherein the location in the PEI PDCCH communication starts from a next bit after additional information that is included in the PEI PDCCH communication after the bitmap.

4. The UE of claim 1, wherein the one or more processors are configured to receive an indication of the length of the bitmap.

5. The UE of claim 4, wherein the one or more processors are configured to receive a TRS configuration associated with the indication.

6. The UE of claim 1, wherein a length of the PEI is based at least in part on a quantity of paging occasions indicated by the PEI PDCCH communication and a quantity of subgroups of each paging occasion.

7. A network entity for wireless communication, comprising:
- a memory; and
- one or more processors, coupled to the memory, configured to:
  - transmit, to a user equipment (UE), a configuration for paging enhancements in a system information block based at least in part on a UE capability of the UE for receiving configurations for paging enhancements, wherein the UE capability is for an idle or inactive state of the UE, and wherein the UE capability does not support paging enhancements for UE subgrouping or wakeup based at least in part on a paging early indication (PEI);
  - transmit, to the UE, an indication of a length of a bitmap that the UE is to use for indicating a PEI in a PEI physical downlink control channel (PDCCH) communication;
  - transmit the PEI PDCCH communication with the bitmap and tracking reference signal (TRS) availability information starting at a next bit after the bitmap; and
  - transmit a TRS based at least in part on the TRS availability information.

8. The network entity of claim 7, wherein the one or more processors are configured to transmit a TRS configuration associated with the indication.

9. The network entity of claim 8, wherein the one or more processors are configured to reconfigure the TRS configuration based at least in part on a reconfiguration of the length of the bitmap.

10. The network entity of claim 9, wherein the one or more processors are configured to transmit the reconfigured TRS configuration and the reconfigured length of the bitmap.

11. A user equipment (UE) for wireless communication, comprising:
- a memory; and
- one or more processors, coupled to the memory, configured to:
  - receive a configuration for paging enhancements in a system information block based at least in part on a UE capability of the UE for receiving configurations for paging enhancements, wherein the UE capability is for an idle or inactive state of the UE, and wherein the UE capability does not support paging enhancements for UE subgrouping or wakeup based at least in part on a paging early indication (PEI);
  - receive a PEI physical downlink control channel (PDCCH) communication that includes tracking reference signal (TRS) availability information that starts at a specified starting bit location in the PEI PDCCH communication; and
  - receive a TRS if the TRS availability information indicates that the TRS is to be transmitted.

12. The UE of claim 11, wherein the one or more processors are configured to receive an indication of the specified starting bit location from a network entity.

13. The UE of claim 11, wherein the one or more processors are configured to obtain an indication of the specified starting bit location from stored configuration information.

14. The UE of claim 11, wherein the one or more processors are configured to receive an indication of a length of a bitmap associated with indicating the PEI in the PEI PDCCH communication.

15. The UE of claim 14, wherein the one or more processors are configured to receive a TRS configuration associated with the indication.

16. The UE of claim 14, wherein one or more bits after an end of the bitmap are not used by the TRS availability information.

17. An apparatus for wireless communication, comprising:
- means for receiving a configuration for paging enhancements in a system information block based at least in part on a capability of the apparatus for receiving configurations for paging enhancements, wherein the capability is for an idle or inactive state of the apparatus, and wherein the capability does not support paging enhancements for user equipment subgrouping or wakeup based at least in part on a paging early indication (PEI);
- means for receiving a PEI physical downlink control channel (PDCCH) communication with tracking reference signal (TRS) availability information at a location that is based at least in part on a length of a bitmap to be used for indicating a PEI; and
- means for receiving a TRS if the TRS availability information indicates that the TRS is to be transmitted.

18. The apparatus of claim 17, wherein the location in the PEI PDCCH communication starts from a next bit after an end of the bitmap.

19. The apparatus of claim 17, wherein the location in the PEI PDCCH communication starts from a next bit after additional information that is included in the PEI PDCCH communication after the bitmap.

20. The apparatus of claim 17, further comprising means for receiving an indication of the length of the bitmap.

21. The apparatus of claim 20, further comprising means for receiving a TRS configuration associated with the indication.

22. The apparatus of claim 17, wherein a length of the PEI is based at least in part on a quantity of paging occasions indicated by the PEI PDCCH communication and a quantity of subgroups of each paging occasion.

* * * * *